(12) United States Patent
Niaz

(10) Patent No.: US 11,572,819 B2
(45) Date of Patent: Feb. 7, 2023

(54) END CAN ASSEMBLY FOR AN ENGINE EXHAUST AFTERTREATMENT CANISTER

(71) Applicant: Perkins Engines Company Limited, Peterborough (GB)

(72) Inventor: Naseer Niaz, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 143 days.

(21) Appl. No.: 16/771,516

(22) PCT Filed: Dec. 18, 2018

(86) PCT No.: PCT/EP2018/025325
§ 371 (c)(1),
(2) Date: Jun. 10, 2020

(87) PCT Pub. No.: WO2019/120623
PCT Pub. Date: Jun. 27, 2019

(65) Prior Publication Data
US 2021/0363906 A1    Nov. 25, 2021

(30) Foreign Application Priority Data
Dec. 21, 2017    (GB) ..................................... 1721589

(51) Int. Cl.
*F01N 3/00* (2006.01)
*F01N 3/28* (2006.01)
(Continued)

(52) U.S. Cl.
CPC .......... *F01N 3/2892* (2013.01); *B01F 25/431* (2022.01); *F01N 3/021* (2013.01); *F01N 3/2803* (2013.01)

(58) Field of Classification Search
CPC ...... F01N 3/2892; F01N 3/021; F01N 3/2803; F01N 2240/20; F01N 2470/02; F01N 2470/18; F01N 2470/04
(Continued)

(56) References Cited

U.S. PATENT DOCUMENTS 8,033,104 B2    10/2011    Zhang
8,105,407 B2    1/2012    Taniguchi
(Continued)

FOREIGN PATENT DOCUMENTS

CN    107178412 A    9/2017
CN    206928991 U    1/2018
(Continued)

OTHER PUBLICATIONS

English translation of Chinese Patent Application Publication No. CN 107178412A (Sep. 19, 2017) (Year: 2017).*
(Continued)

*Primary Examiner* — Matthew T Largi

(57) ABSTRACT

An end can assembly for an engine exhaust aftertreatment canister comprises an end can formed from an end plate and a wall extending from a periphery of the end plate, the end plate and the wall having a first cutaway portion formed therein. A pipe is provided in the first cutaway portion and attached to the end can around the first cutaway portion to form a seal with the end can, the pipe having at least one opening provided therein which opens into an interior of the end can assembly. A bracket, comprising a plate and a shoulder extending at an angle from the plate, is attached to the end plate and to the wall, the shoulder having a second cutaway portion formed therein which is shaped to receive the pipe whereby the shoulder abuts the pipe and provides structural support to the pipe and end can.

10 Claims, 4 Drawing Sheets

(51) Int. Cl.
*F01N 3/021* (2006.01)
*B01F 25/431* (2022.01)

(58) Field of Classification Search
USPC .......................................................... 422/310
See application file for complete search history.

(56) References Cited

U.S. PATENT DOCUMENTS

| | | | |
|---|---|---|---|
| 8,776,509 B2 | 7/2014 | Wikaryasz et al. | |
| 8,938,954 B2 | 1/2015 | De Rudder et al. | |
| 9,644,517 B2 | 5/2017 | De Rudder | |
| 9,707,525 B2 | 7/2017 | De Rudder et al. | |
| 10,830,117 B2* | 11/2020 | Zoran | F01N 3/103 |
| 2006/0225951 A1* | 10/2006 | Mavinahally | F01N 13/1872 |
| | | | 181/264 |
| 2008/0314027 A1 | 12/2008 | Barber et al. | |
| 2009/0260351 A1* | 10/2009 | Cremeens | F01N 3/005 |
| | | | 60/324 |
| 2010/0199645 A1 | 8/2010 | Telford | |
| 2011/0047963 A1 | 3/2011 | Kasaoka et al. | |
| 2013/0097978 A1 | 4/2013 | Nagasaka et al. | |
| 2013/0213013 A1* | 8/2013 | Mitchell | F01N 3/2066 |
| | | | 73/23.31 |
| 2013/0276438 A1* | 10/2013 | De Rudder | B01D 53/9431 |
| | | | 60/324 |
| 2013/0333357 A1* | 12/2013 | Nagata | F01N 13/08 |
| | | | 60/282 |
| 2015/0240692 A1* | 8/2015 | De Rudder | F01N 3/2892 |
| | | | 422/168 |
| 2015/6267655 | 9/2015 | Madeira | |
| 2015/0275728 A1* | 10/2015 | Braun | F01N 3/20 |
| | | | 60/324 |
| 2016/0053657 A1* | 2/2016 | Quadri | F01N 3/28 |
| | | | 60/311 |
| 2016/0115847 A1* | 4/2016 | Chapman | B01F 5/0473 |
| | | | 60/324 |
| 2016/0146165 A1 | 5/2016 | Gehlhoff et al. | |
| 2017/0081999 A1* | 3/2017 | Lee | F01N 3/0842 |
| 2019/0323402 A1* | 10/2019 | Tucker | B01F 5/0473 |
| 2020/0173330 A1* | 6/2020 | Tucker | F01N 3/2892 |

FOREIGN PATENT DOCUMENTS

| | | |
|---|---|---|
| CN | 206987620 U | 2/2018 |
| EP | 2823880 A1 | 1/2015 |
| WO | WO 2014/171923 A1 | 10/2014 |

OTHER PUBLICATIONS

International Search Report for related International Application No. PCT/EP2018/025325; report dated Feb. 15, 2019.
United Kingdom Search Report for related GB Application No. GB1721589.8 report dated Jun. 12, 2018.

\* cited by examiner

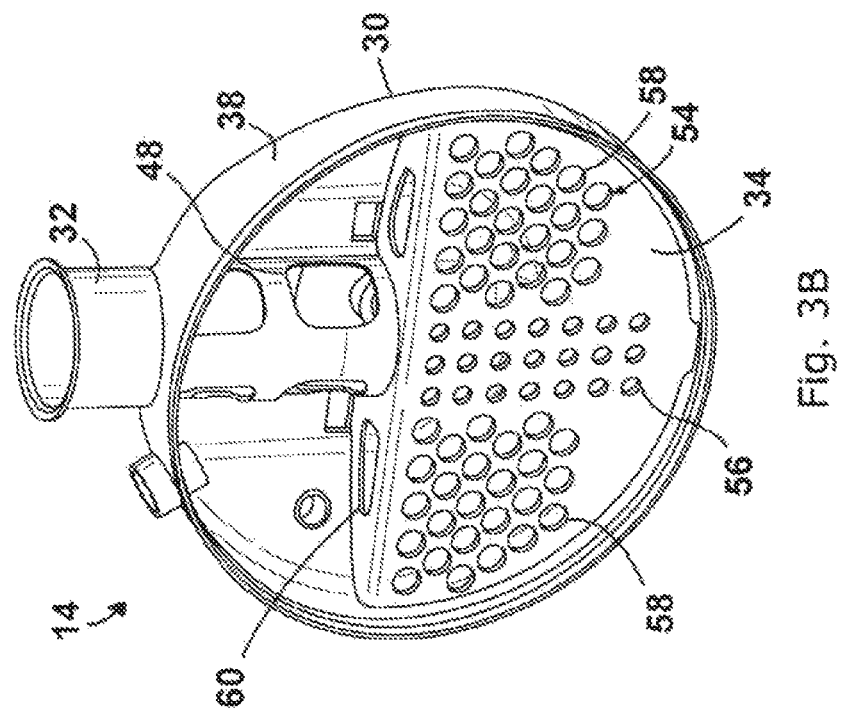
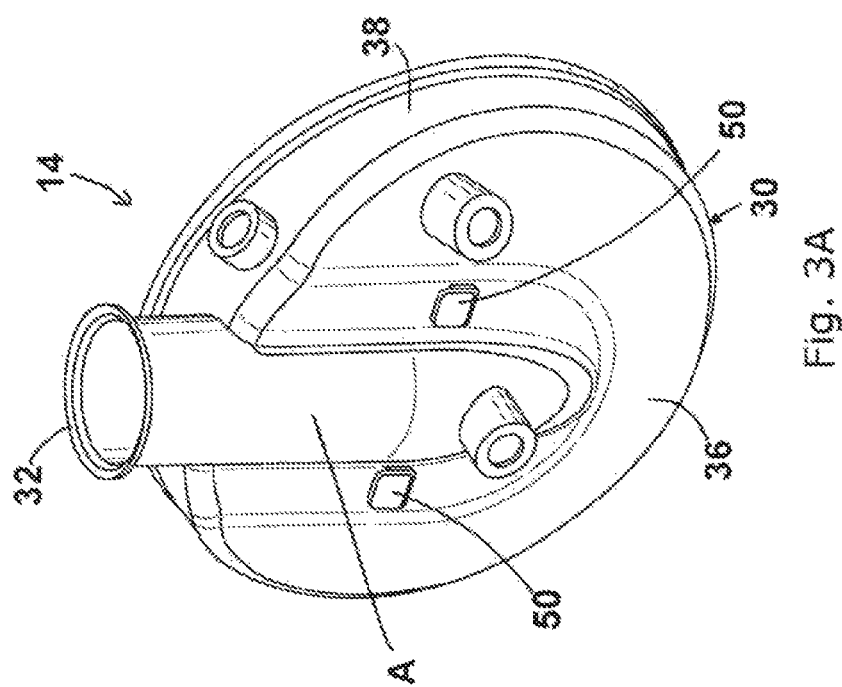

END CAN ASSEMBLY FOR AN ENGINE EXHAUST AFTERTREATMENT CANISTER

CROSS-REFERENCE TO RELATED APPLICATION

This application claims priority under 3.5 USC § 119 and the Paris Convention to Great Britain Patent Application No. 1721589.8 filed on Dec. 21, 2017.

TECHNICAL FIELD

The present disclosure relates to engine exhaust aftertreatment systems, and in particular to an end can assembly for an engine exhaust aftertreatment canister.

BACKGROUND

Engine exhaust aftertreatment systems are used to reduce emissions in the exhaust stream of an internal combustion engine. Such aftertreatment systems often consist of several aftertreatment devices, such as particulate filters and catalytic converters. Aftertreatment devices are typically provided in a housing or canister through which the exhaust stream passes. End caps are mounted on each end of the canister. Each end cap has a pipe which acts as an inlet or outlet depending on which end of the canister the end cap is mounted to.

Emissions legislation is mandating increasingly stringent emissions requirements for engines. Manufacturers can be faced with the need to provide aftertreatment devices, or provide higher performance aftertreatment devices, in existing engine designs in order to meet new emissions requirements. Meeting these emissions requirements can present challenges where available space in an existing engine is limited. In the case of the canister and end caps described above, while the end caps are convenient for assembly and servicing, they also take up additional space which may inhibit installation of the canister.

A further consideration for manufacturers is how the exhaust stream flows through the canister. It is desirable for the exhaust gases to flow evenly through the canister to improve the performance of the after treatment device. To achieve an even flow, a baffle may be used. U.S. Pat. No. 9,707,525 discloses a baffle plate that deflects a first portion of exhaust gas flow while allowing a second portion of exhaust gas flow to pass through openings in the baffle plate. The baffle plate causes exhaust gas to flow 270 degrees around a perforated tube, one end of which forms an outlet of the aftertreatment device. While such baffles help improve performance of the aftertreatment device, they also take up space within the canister, as exemplified in the U.S. Pat. No. 9,707,525.

SUMMARY OF THE DISCLOSURE

In one aspect of the present disclosure, an end can assembly for an engine exhaust aftertreatment canister is provided. The end can comprises an end plate and a wall extending from a periphery of the end plate, the end plate and the wall having a first cutaway portion formed therein. A pipe is provided in the first cutaway portion and attached to the end can around the first cutaway portion to form a seal with the end can, the pipe comprising at least one portion removed therefrom to define at least one opening therein which opens into an interior of the end can assembly. A bracket comprising a plate and a shoulder extending at an angle from the plate is attached to the end plate and to the wall, the shoulder having a second cutaway portion formed therein which is shaped to receive the pipe whereby the shoulder abuts the pipe.

In another aspect of the present disclosure, a bracket for an end can comprising an end plate and a wall extending from a periphery of the end plate is provided. The bracket comprises a plate and a shoulder extending at an angle from the plate, the shoulder having a cutaway portion formed therein which is shaped to receive a pipe whereby the shoulder abuts the pipe. A plurality of tabs extend outwardly from the bracket for attachment to the end plate or to the wall. A plurality of portions are removed from the bracket to form a plurality of apertures in the bracket, a first set of the plurality of apertures are provided centrally on the plate and a second set of the plurality of apertures are provided to either side of the first set, wherein a combined cross-sectional area of the apertures in the first set is less than a combined cross-sectional area of the apertures in the second set.

Other features and aspects of this disclosure will be apparent from the following description and the accompanying drawings.

BRIEF DESCRIPTION OF THE DRAWINGS

FIG. 3A and FIG. 3B are front and rear views of the end can assembly of FIG. 2 in assembled form.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
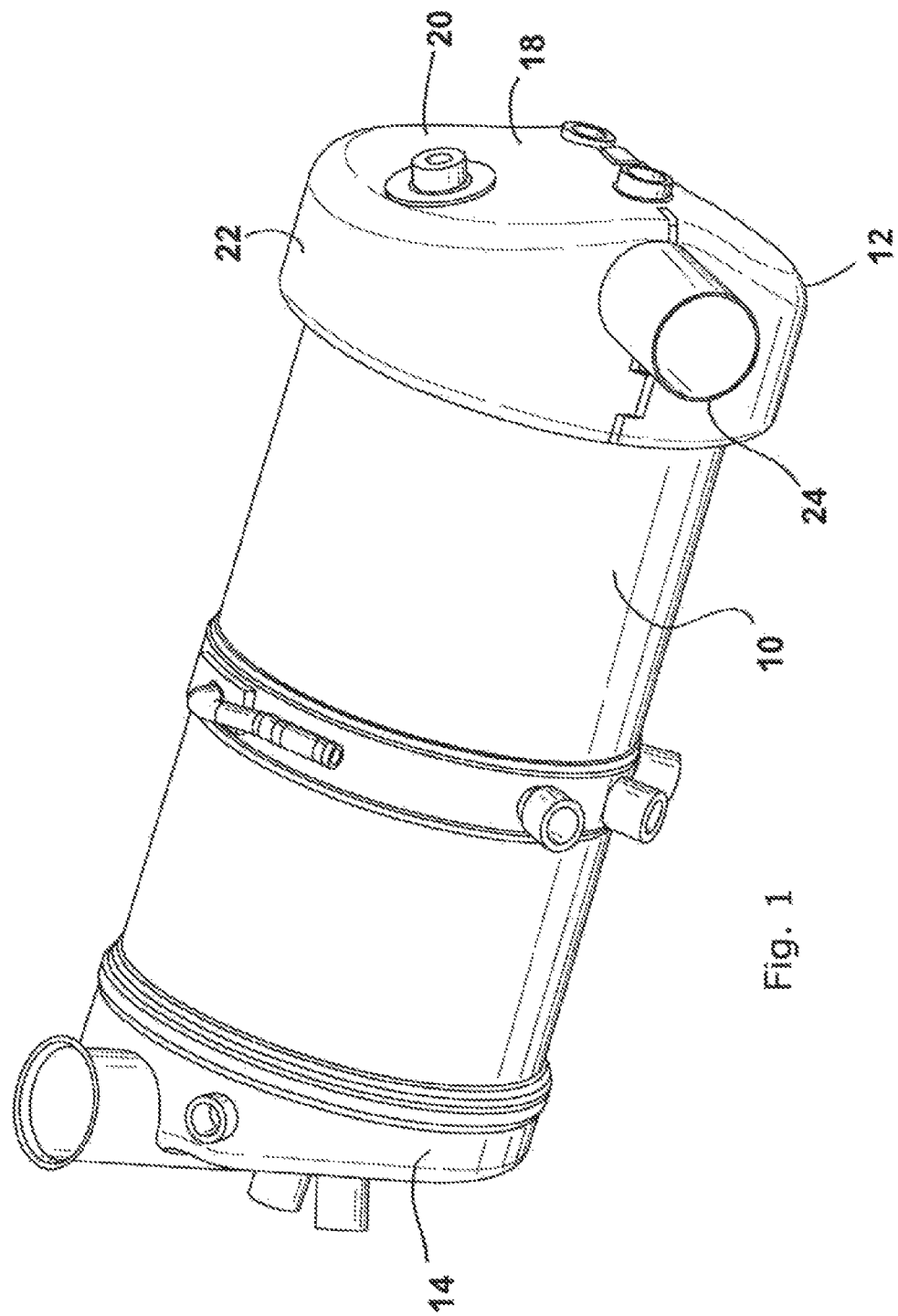
FIG. 1 shows an engine exhaust aftertreatment canister in which embodiments of the present disclosure may be provided.

Referring to FIG. 1, there is shown an engine exhaust aftertreatment canister 10 in which embodiments of the present disclosure may be provided. The canister 10 has a first end can assembly 12 and a second end can assembly 14 provided at opposite ends.

The first end can assembly 12 has an end can 18 formed from an end plate 20 and a wall 22 extending from the end plate 20 around its periphery. A pipe 24 passes through the wall 22 and into an interior of the canister 10. The pipe 24 may be used as an inlet or an outlet for the canister according to how the canister is installed. As shown in FIG. 1, the wall 22 extends from the end plate 20 sufficiently far as to be able to accommodate the pipe 24, with the result that the first end can assembly 12 adds significantly to the canister 10's length.

The second end can assembly 14, provided according to embodiments of the present disclosure and described in detail below, has a lower profile than the first end can assembly 12. As a result, the second end can assembly 14 adds less to the overall canister 10's length than the first end can assembly 12. This may enable the canister 10 to be used in engines with limited available space without requiring the canister 10 to be redesigned. Redesigning the canister 10 is undesirable since the canister 10 typically houses one or more aftertreatment substrates which would also require redesign should the canister 10 be shortened, which may be expensive and/or may affect the performance of the aftertreatment system.

It will be appreciated by those skilled in the art that the second end can assembly 14 may be used on both ends of the canister 10 to further reduce an overall length of the canister 10. Further, other orientations of the first and second end can assemblies 12, 14 may be used according to requirements.

Figure 2:
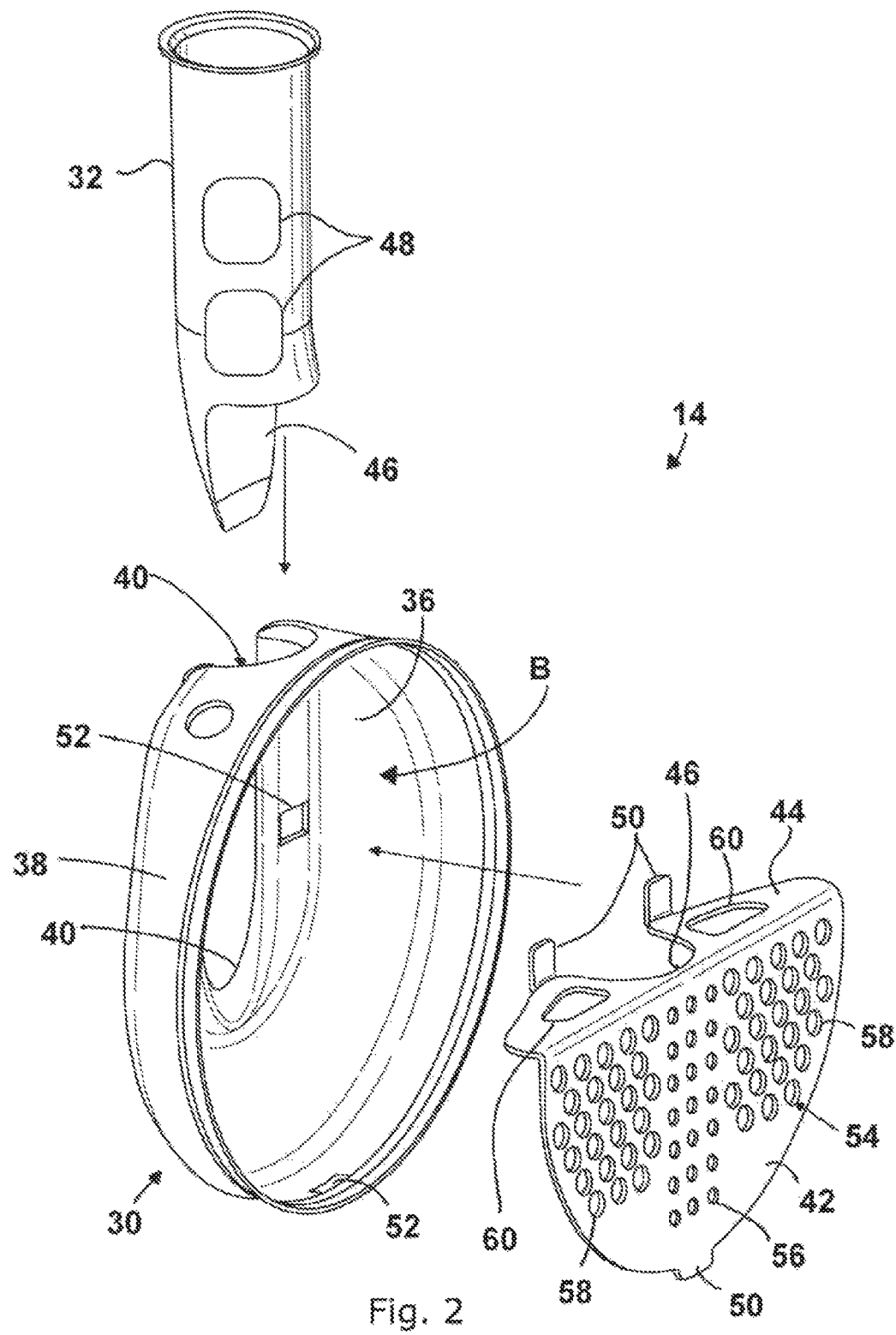
FIG. 2 is an exploded view of an end can assembly according to embodiments of the present disclosure.

Referring now to FIG. 2 the second end can assembly 14 is shown in exploded form. The second end can assembly 14 comprises an end can 30, a pipe 32 and a bracket 34.

The end can 30 comprises an end plate 36 and a wall 38 extending from a periphery of the end plate 36. The end plate 36 and the wall 38 have a first cutaway portion 40 formed therein.

The pipe 32 is provided in the first cutaway portion 40 and attached to the end can 30 around the first cutaway portion 40 to form a seal with the end can 30. The pipe 32 may be attached to the end can 30 by any suitable means, such as welding or adhesive.

The bracket 34 comprises a plate 42 and a shoulder 44 extending at an angle from the plate 42. In the embodiment shown in FIG. 2, the shoulder 44 extends perpendicularly from the plate 42 however other configurations may be used. The bracket 34 is attached to the end plate 36 and to the wall 38 as will be described in more detail below. The shoulder 44 has a second cutaway portion 46 formed therein which is shaped to receive the pipe 32 such that the shoulder 44 abuts the pipe 32 when in place, as can be seen in FIG. 3B, which may provide support to the pipe 32.

Referring now to FIGS. 3A and 3B, the pipe 32 may partially extend across the end plate 36 as best seen in FIG. 3A. When received in the first cutaway portion 40 and attached to the end can 30, a portion A of the pipe 32 may define an end of the end can 30 together with the end plate 36. An end 46 of the pipe 32 may be received in the end can 30. The end 46 may be an open end as shown in FIG. 2.

The pipe 32 has at least one portion removed to form at least one opening 48 therein which opens into an interior B of the second end can assembly 14 to permit exhaust gases to enter or exit the canister 10 according to which end of the canister the second end can assembly 14 is located. The pipe 32 may have a plurality of openings in some embodiments, such as in the embodiment illustrated in the drawings where four openings 48 are provided between the shoulder 44 of the bracket 34 and the wall 38 proximate the first cutaway portion 40.

The bracket 34 may further comprise a plurality of tabs 50 extending outwardly therefrom, each tab 50 being attached to the end plate 36 or to the wall 38. In embodiments of the present disclosure each tab 50 is received in a corresponding opening 52 formed in the end plate 36 or the wall 38, however other means of attaching the tabs 50 to the end plate 36 and wall 38 may be used. At least one tab 50 may be provided on the shoulder 44 adjacent each side of the second cutaway portion 46 which are received in corresponding openings 52 in the end plate 36 as illustrated in FIG. 2. The shoulder 44 may abut the pipe 32 adjacent the end 46 of the pipe 32, and may further abut the pipe 32 between the end 46 and the openings 48. Such an arrangement may enable the bracket 34 to hold the pipe 32 in place and may strengthen the second end can assembly 14. Such strengthening may be beneficial in resisting wear and tear arising from installation and use of the canister 10 in an engine.

The plate 42 may be attached to the wall 38 remote from the first cutaway portion 40. For example, at least one of the tabs 50 may be provided on the plate 42 remote from the shoulder 44, which is received in a corresponding opening 52 in the wall 38.

In the embodiment of the present disclosure illustrated in the drawings, the tabs 50 are received in corresponding openings 52 in the end plate 36 and the wall 38. The tabs 50 may then be attached to the end plate 36 and the wall 38, for instance by welding or adhesive, to form a seal between the tabs 50 and the end plate 36 and the wall 38.

The plate 42 may be shaped to conform to the wall 38. Similarly, the shoulder 44 may be shaped to conform with the end plate 36. The bracket 34 may thus act as a baffle to control a flow of exhaust gases into the open end 48 of the pipe. A plurality of portions may be removed from the bracket to form a plurality of apertures 54 in the bracket to allow a controlled flow of exhaust gases to/from the open end 48 of the pipe 32.

The plurality of apertures 54 may be formed in the plate 42. A first set 56 of the plurality of apertures 54 may be provided centrally on the plate 42, proximate the pipe 32. A second set 58 of the plurality of apertures 54 may be provided to either side of the first set 56. A combined cross-sectional area of the apertures 54 in the first set 56 is less than a combined cross-sectional area of the apertures 54 in the second set 58. In embodiments of the present disclosure each aperture 54 in the first set 56 may have a smaller cross-sectional area than the apertures 54 in the second set 58. A further plurality of apertures 60 are formed in the shoulder 44. The arrangement of the apertures 54 and 60 may encourage a more even flow of exhaust gases across the plate 42, and may also encourage an even flow of exhaust gases entering or leaving the pipe 32 via the open end 46 and via the openings 48.

Referring now to FIG. 3A, the first cutaway portion 40 in the wall 38 may be shaped such that when the pipe 32 is in place, the wall 38 extends more than half way around the pipe but less than fully encloses the pipe. For example, the wall 38 may extend more than 180 degrees around a circular pipe while not extending a full 360 degrees. This arrangement may help retain the pipe in place and may strengthen the second end can assembly 14.

The bracket 34 may be formed from any suitable material, including metal. Any suitable manufacturing method may be used to form the bracket 34, however the bracket 34 is particularly suited to being formed from sheet metal which has the benefit of low cost of manufacture. While the above description mentions portions may be removed from the bracket and to form apertures it will be appreciated that the bracket may be formed by additive manufacturing methods in which case the bracket will be formed with apertures already formed therein.

Figure 4:
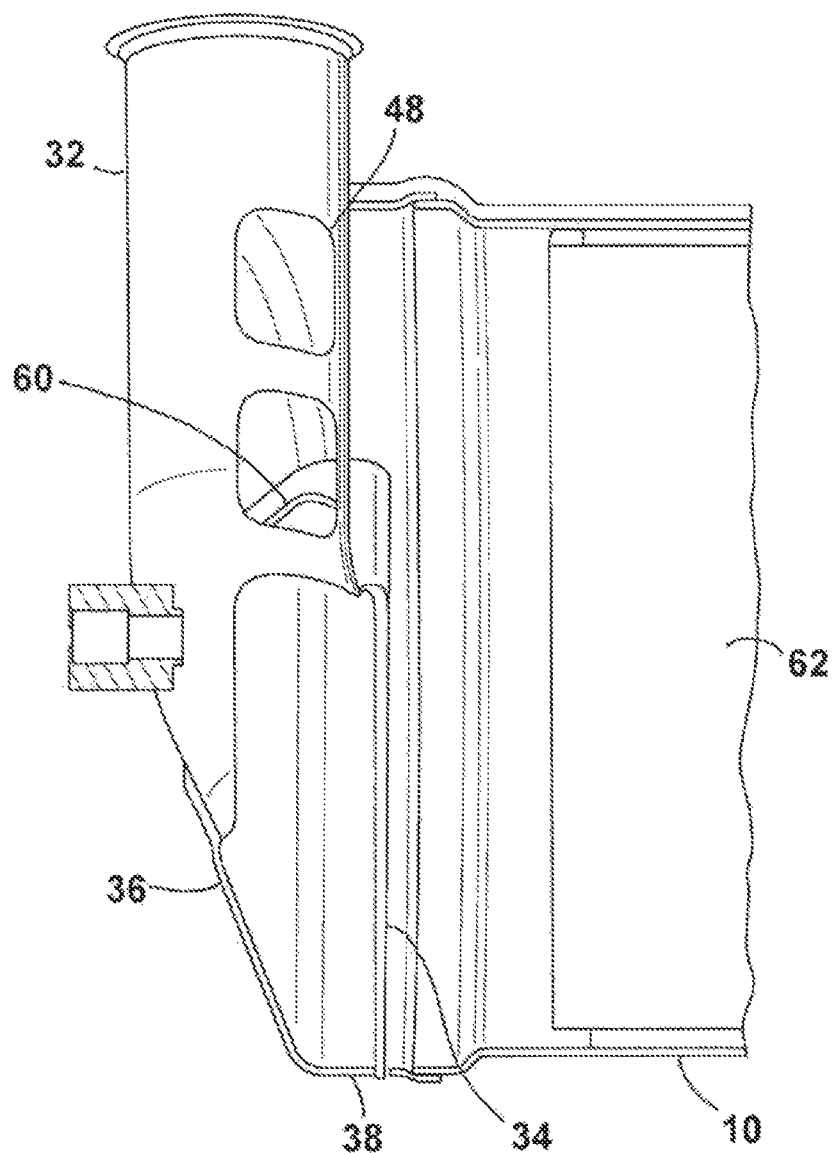
FIG. 4 is a side view of the end can assembly of FIG. 2 in cross-section.

Referring now to FIG. 4, in which the second end can assembly 14 is shown in place on the canister 10, it can be seen that the second end can assembly 14 provides a low profile which adds little length to the canister 10, which may permit the canister 10 to be used in engines with limited available space. The apertures 54, 60 in the bracket 34 may enable the bracket 34 to act as a baffle that provides an even flow of gases through the canister 10; such baffles may need to be spaced from a substrate 62 in the canister 10. By configuring the bracket 34 to act as baffle may further reduce the profile of the second end can assembly 14.

INDUSTRIAL APPLICATION

Embodiments of the present disclosure have been described that provide an end can assembly for an engine exhaust aftertreatment canister and a bracket therefor, which may reduce an overall size of the canister with end cans fitted and thus allow aftertreatment systems to be provided in engines with limited space available for aftertreatment systems. The end can assembly of the present disclosure integrates the pipe into the end can, while providing the bracket to strengthen the end can assembly and hold the pipe in place. Further, in embodiments of the present disclosure the bracket is provided with apertures that permit the bracket to act as a baffle to provide an even flow of gases through the canister without needing a separate baffle.

While aspects of the present disclosure have been particularly shown and described with reference to the embodiments above, it will be understood by those skilled in the art that various additional embodiments may be contemplated by the modification of the disclosed machines, systems and methods without departing from the scope of the present disclosure. Such embodiments should be understood to fall within the scope of the present disclosure as determined based upon the claims and any equivalents thereof.

LIST OF SELECTED EMBODIMENTS

For convenience, selected embodiments of the present disclosure as detailed above are summarised in the following, non-exhaustive list, wherein each selected Embodiment is identified by a number used only in this List.

Embodiment 1. An end can assembly for an engine exhaust aftertreatment canister, comprising:
an end can comprising an end plate and a wall extending from a periphery of the end plate, the end plate and the wall having a first cutaway portion formed therein;
a pipe provided in the first cutaway portion and attached to the end can around the first cutaway portion to form a seal with the end can, the pipe comprising at least one portion removed therefrom to define at least one opening therein which opens into an interior of the end can assembly; and
a bracket comprising a plate and a shoulder extending at an angle from the plate, the bracket being attached to the end plate and to the wall, the shoulder having a second cutaway portion formed therein which is shaped to receive the pipe whereby the shoulder abuts the pipe.

Embodiment 2. The assembly of Embodiment 1, wherein the pipe partially extends across the end plate, whereby the shoulder abuts the pipe adjacent an end of the pipe received in the end can.

Embodiment 3. The assembly of Embodiment 2, wherein the end of the pipe comprises an open end.

Embodiment 4. The assembly of any of Embodiments 1 to 3, wherein the plate is attached to the wall remote from the first cutaway portion.

Embodiment 5. The assembly of any of Embodiments 1 to 4, wherein the pipe has a plurality of portions removed to form a plurality of openings therein between the shoulder of the bracket and the wall proximate the first cutaway portion.

Embodiment 6. The assembly of any of Embodiments 1 to 4, wherein the bracket further comprises a plurality of tabs extending outwardly therefrom, each tab being attached to the end plate or to the wall.

Embodiment 7. The assembly of Embodiment 6, wherein each tab is received in a corresponding opening formed in the end plate or the wall.

Embodiment 8. The assembly of Embodiment 6 or 7, wherein at least one tab is provided on the shoulder adjacent each side of the second cutaway portion.

Embodiment 9. The assembly of any of Embodiments 6 to 8, wherein at least one tab is provided on the plate remote from the shoulder.

Embodiment 10. The assembly of any of Embodiments 1 to 9, wherein the plate is shaped to conform to the wall.

Embodiment 11. The assembly of any of Embodiments 1 to 10, wherein the shoulder is shaped to conform with the end plate.

Embodiment 12. The assembly of any of Embodiments 1 to 11, wherein a plurality of portions are removed from the bracket to form a plurality of apertures in the bracket.

Embodiment 13. The assembly of Embodiment 12, wherein the plurality of apertures formed in the plate.

Embodiment 14. The assembly of Embodiment 13, wherein a first set of the plurality of apertures are provided centrally on the plate and a second set of the plurality of apertures are provided to either side of the first set, wherein a combined cross-sectional area of the apertures in the first set is less than a combined cross-sectional area of the apertures in the second set.

Embodiment 15. The assembly of Embodiment 14, wherein each aperture in the first set has a smaller cross-sectional area than the apertures in the second set.

Embodiment 16. The assembly of any of Embodiments 12 to 15, wherein a further plurality of apertures are formed in the shoulder.

Embodiment 17. A bracket for an end can comprising an end plate and a wall extending from a periphery of the end plate, the bracket comprising:
a plate and a shoulder extending at an angle from the plate;
the shoulder having a cutaway portion formed therein which is shaped to receive a pipe whereby the shoulder abuts the pipe;
a plurality of tabs extending outwardly from the bracket for attachment to the end plate or to the wall; and
wherein a plurality of portions are removed from the bracket to form a plurality of apertures in the bracket, a first set of the plurality of apertures are provided centrally on the plate and a second set of the plurality of apertures are provided to either side of the first set, wherein a combined cross-sectional area of the apertures in the first set is less than a combined cross-sectional area of the apertures in the second set.

Embodiment 18. The bracket of Embodiment 17, wherein at least one tab is provided on the shoulder adjacent each side of the second cutaway portion, and at least one tab is provided on the plate remote from the shoulder.

Embodiment 19. The bracket of Embodiment 17 or 18, wherein each aperture in the first set has a smaller cross-sectional area than the apertures in the second set.

Embodiment 20. The bracket of any of Embodiments 17 to 19, wherein a further plurality of apertures are formed in the shoulder.

In the claims, reference numerals and characters are provided in parentheses purely for ease of reference and are not to be construed as limiting features.

The invention claimed is:

1. An end can assembly for an engine exhaust aftertreatment canister, comprising:
an end can comprising an end plate and a wall extending from a periphery of the end plate, the end plate and the wall having a first cutaway portion formed therein;
a pipe received in the first cutaway portion and attached to the end can around the first cutaway portion to form a seal with the end can, the pipe comprising at least one portion removed therefrom to define at least one opening therein which opens into an interior of the end can assembly; and a bracket comprising a plate and a shoulder extending at an angle from the plate, the bracket being attached to the end plate and to the wall, the shoulder having a second cutaway portion formed therein which is shaped to receive the pipe whereby the shoulder abuts the pipe, the first cutaway portion being shaped such that when the pipe is provided in the first cutaway portion, the wall less than fully encloses the pipe, and when the pipe is received in the first cutaway portion and attached to the end can, a surface portion of the pipe and the end plate define an end of the end can.

2. The assembly of claim 1, wherein the pipe has a plurality of portions removed to form a plurality of openings therein between the shoulder of the bracket and the wall proximate the first cutaway portion.

3. The assembly of claim 1, wherein the bracket further comprises a plurality of tabs extending outwardly therefrom, each tab being attached to the end plate or to the wall.

4. The assembly of claim 1, wherein the plate is shaped to conform to the wall.

5. The assembly of claim 1, wherein the shoulder is shaped to conform with the end plate.

6. The assembly of claim 1, wherein a plurality of portions are removed from the bracket to form a plurality of apertures in the bracket.

7. A bracket for an end can comprising an end plate and a wall extending from a periphery of the end plate, the end plate and the wall having a cutaway portion configured to receive a pipe, and a surface portion of the pipe and the end plate define an end of the end can the bracket comprising:

a plate and a shoulder extending at an angle from the plate;

the shoulder having a shoulder cutaway portion formed therein which is shaped to receive the pipe whereby the shoulder abuts the pipe, the shoulder cutaway portion being shaped such that the shoulder extends less than 360 degrees around the pipe;

a plurality of tabs extending outwardly from the bracket for attachment to the end plate or to the wall; and wherein a plurality of portions are removed from the bracket to form a plurality of apertures in the bracket, a first set of the plurality of apertures are provided centrally on the plate and a second set of the plurality of apertures are provided to either side of the first set, wherein a combined cross-sectional area of the apertures in the first set is less than a combined cross-sectional area of the apertures in the second set.

8. The bracket of claim 7, wherein at least one of the plurality of tabs is provided on the shoulder adjacent each side of the cutaway portion, and at least one of the plurality of tabs is provided on the plate remote from the shoulder.

9. The bracket of claim 7, wherein each aperture in the first set has a smaller cross-sectional area than the apertures in the second set.

10. The bracket of claim 7, wherein a further plurality of apertures are formed in the shoulder.

* * * * *